(12) United States Patent
Su et al.

(10) Patent No.: US 11,907,747 B2
(45) Date of Patent: Feb. 20, 2024

(54) METHOD FOR DEPLOYING PRODUCT APPLICATIONS WITHIN VIRTUAL MACHINES ONTO ON-PREMISES AND PUBLIC CLOUD INFRASTRUCTURES

(71) Applicant: EMC IP Holding Company LLC, Hopkinton, MA (US)

(72) Inventors: Lihui Su, Shanghai (CN); Yujun Liang, Shanghai (CN); Yin Wei, Shanghai (CN); Ming Zhang, Shanghai (CN); James Morton, Adamstown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 17/198,480

(22) Filed: Mar. 11, 2021

(65) Prior Publication Data

US 2022/0291940 A1  Sep. 15, 2022

(51) Int. Cl.
   *G06F 9/455*  (2018.01)
   *G06F 11/07*  (2006.01)
   *G06F 8/65*   (2018.01)

(52) U.S. Cl.
   CPC ............ *G06F 9/45558* (2013.01); *G06F 8/65* (2013.01); *G06F 9/45545* (2013.01); *G06F 11/0772* (2013.01); *G06F 2009/45562* (2013.01); *G06F 2009/45595* (2013.01)

(58) Field of Classification Search
   CPC .... G06F 9/45558; G06F 8/65; G06F 9/45545; G06F 2009/45562; G06F 2009/45595
   See application file for complete search history.

(56) References Cited

U.S. PATENT DOCUMENTS

| | | | | |
|---|---|---|---|---|
| 10,019,252 | B1* | 7/2018 | Cui | G06F 9/4401 |
| 10,044,675 | B1* | 8/2018 | Ettema | H04L 63/0227 |
| 10,482,239 | B1* | 11/2019 | Liu | G06F 21/563 |
| 11,159,402 | B1* | 10/2021 | Subramanian | H04L 41/0895 |
| 2016/0070563 | A1* | 3/2016 | Ingle | H04L 67/34 717/172 |
| 2016/0378844 | A1* | 12/2016 | Karve | G06F 16/178 707/620 |
| 2017/0262345 | A1* | 9/2017 | Wang | G06F 11/1469 |
| 2017/0308367 | A1* | 10/2017 | Clothier | G06F 8/61 |
| 2017/0323105 | A1* | 11/2017 | Wang | G06F 9/45558 |
| 2019/0018715 | A1* | 1/2019 | Behrendt | G06F 8/71 |
| 2020/0136825 | A1* | 4/2020 | Gupta | H04L 41/0895 |

* cited by examiner

*Primary Examiner* — Dong U Kim
(74) *Attorney, Agent, or Firm* — Chamberlain, Hrdlicka, White, Williams & Aughtry; Aly Z. Dossa (57) ABSTRACT

A method for deploying product applications within virtual machines onto on-premises and public cloud infrastructures. Specifically, the disclosed method proposes a migration scheme of virtual machine images (configured at least with product applications and guest operating systems) from an on-premises infrastructure to a public cloud infrastructure. Further, the migration scheme considers two workflows—a normal workflow contingent on the public cloud infrastructure having up-to-date support for the guest operating systems; and an exception workflow contingent on the public cloud infrastructure lacking up-to-date support for the guest operating systems.

20 Claims, 7 Drawing Sheets

METHOD FOR DEPLOYING PRODUCT APPLICATIONS WITHIN VIRTUAL MACHINES ONTO ON-PREMISES AND PUBLIC CLOUD INFRASTRUCTURES

BACKGROUND

Since its advent, public cloud computing has grown immeasurably in popularity and practicality amongst enterprises for its flexibility, reliability, and scalability. Further, though the public cloud often lacks a level of control often found across proprietary data centers, these enterprises evermore agree to the need to leverage the public cloud to achieve their service and/or business goals. A unified process, accordingly, may be desired to facilitate the deployment of product applications onto public cloud infrastructure from and/or on on-premises infrastructure.

SUMMARY

In general, in one aspect, the invention relates to a method for deploying product applications within virtual machines from an on-premises infrastructure onto a public cloud infrastructure. The method includes receiving, by the public cloud infrastructure and from the on-premises infrastructure, an on-premises product virtual machine image including a product application, performing a first import attempt of the on-premises product virtual machine image into a cloud virtual machine image repository, obtaining, based on the first import attempt failing, a cloud product virtual machine instance, and triggering a virtual machine snapshot of the cloud product virtual machine instance to produce a cloud product virtual machine image including the product application.

In general, in one aspect, the invention relates to a non-transitory computer readable medium (CRM). The non-transitory CRM includes computer readable program code, which when executed by a computer processor, enables the computer processor to perform a method for deploying product applications within virtual machines from an on-premises infrastructure onto a public cloud infrastructure. The method includes receiving, by the public cloud infrastructure and from the on-premises infrastructure, an on-premises product virtual machine image including a product application, performing a first import attempt of the on-premises product virtual machine image into a cloud virtual machine image repository, obtaining, based on the first import attempt failing, a cloud product virtual machine instance, and triggering a virtual machine snapshot of the cloud product virtual machine instance to produce a cloud product virtual machine image including the product application.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method for deploying product applications within virtual machines onto on-premises and public cloud infrastructures. Specifically, the disclosed method proposes a migration scheme of virtual machine images (configured at least with product applications and guest operating systems) from an on-premises infrastructure to a public cloud infrastructure. Further, the migration scheme considers two workflows—a normal workflow contingent on the public cloud infrastructure having up-to-date support for the guest operating systems; and an exception workflow contingent on the public cloud infrastructure lacking up-to-date support for the guest operating systems.

Figure 1:
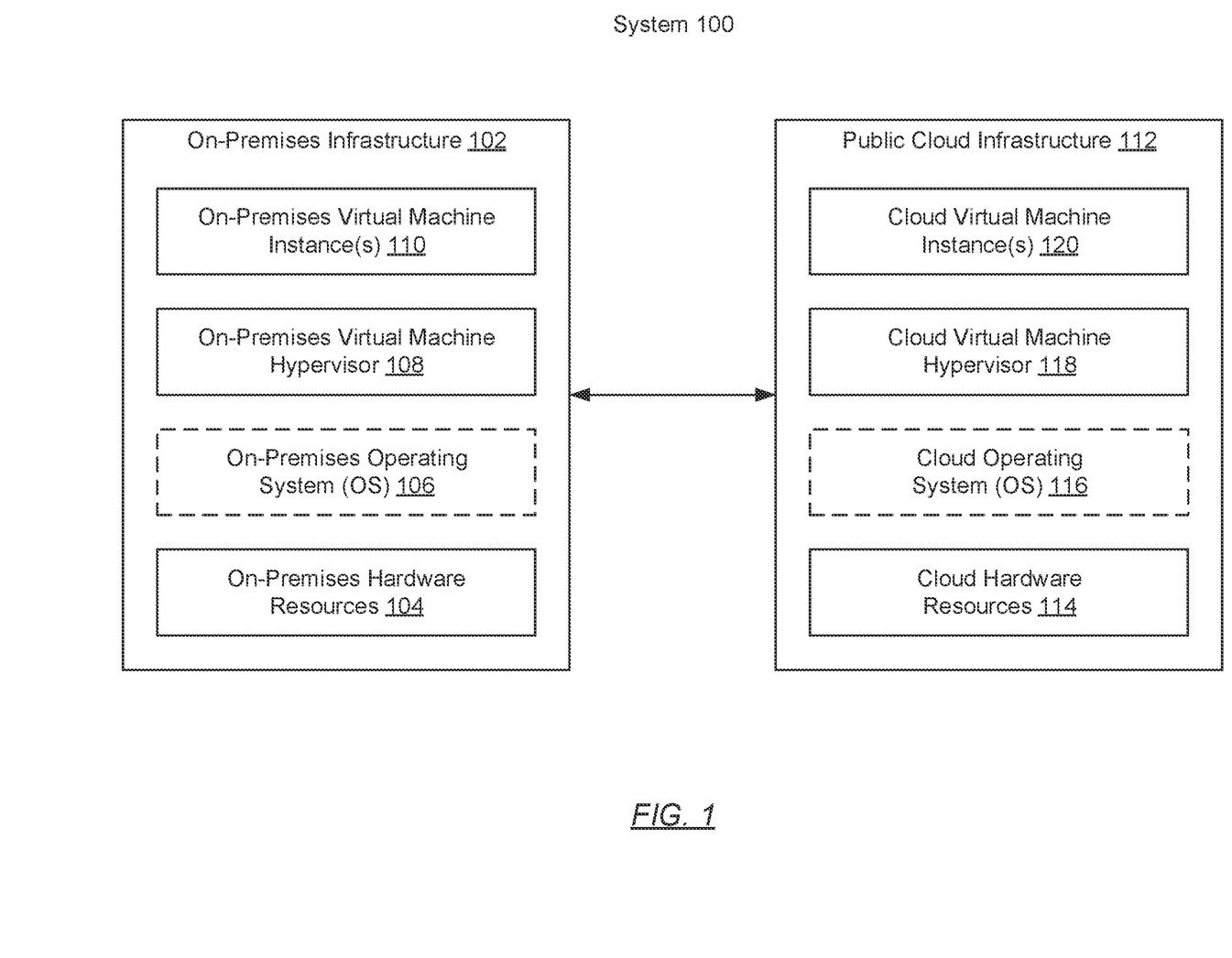
FIG. 1 shows a system in accordance with one or more embodiments of the invention.

FIG. 1 shows a system in accordance with one or more embodiments of the invention. The system (100) may include an on-premises infrastructure (102) operatively connected to a public cloud infrastructure (112). Each of these system (100) components is described below.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

In one embodiment of the invention, the on-premises infrastructure (102) (also referred to as a data center) may represent any privately owned and maintained enterprise information technology (IT) environment. The on-premises infrastructure (102) may include any number and any configuration of physical servers, network security appliances, management systems, application or service delivery controllers, routers, switches, and other known data center sub-systems. Any subset of the on-premises infrastructure (102) may be implemented using computing systems similar to the exemplary computing system shown in FIG. 4. Furthermore, the on-premises infrastructure (102) may include, but is not limited to, any number of on-premises hardware resources (104), (optionally) an on-premises operating system (OS) (106), an on-premises virtual machine hypervisor (108), and any number of on-premises virtual machine instances (110). Each of these on-premises infrastructure (102) subcomponents is described below.

In one embodiment of the invention, the on-premises hardware resource(s) (104) may represent at least a portion of the on-premises infrastructure (102) architecture that includes various physical and/or tangible components. Collectively, these various physical and/or tangible components may enable and provide the framework and resources on which various logical (or software) components (e.g., on-premises OS (106) (if installed), on-premises virtual machine hypervisor (108), and on-premises virtual machine instances (110)) of the on-premises infrastructure (102) may operate. The on-premises hardware resource(s) (104) may include, but is/are not limited to, compute resources, storage resources, and network resources.

In one embodiment of the invention, compute resources may refer to hardware that provides computational (or instructions processing) functionality, which can be requested, allocated, and consumed. Examples of compute resources may include, but are not limited to, central processing units (CPUs) and graphics processing units (GPUs).

In one embodiment of the invention, storage resources may refer to hardware that provides temporary (i.e., volatile) and/or persistent (i.e., non-volatile) data storing functionality, which can be requested, allocated, and consumed. Examples of storage resources may include, but are not limited to, random access memory (RAM), flash memory, read-only memory (ROM), hard disk drives (HDDs), and solid state drives (SSDs).

In one embodiment of the invention, network resources may refer to hardware that provides networking functionality and/or bandwidth, which can be requested, allocated, and consumed. Examples of network resources may include, but are not limited to, network interface cards (NICs) and network adapters.

In one embodiment of the invention, the on-premises OS (106) (if installed) may represent a computer program, or a collection of computer programs, configured for managing the shared utilization of the on-premises hardware resource(s) (104) by the various logical (or software) components of the on-premises infrastructure (102). To that extent, the on-premises OS (106) (if installed) may include functionality to, for example, support fundamental on-premises infrastructure (102) functions, schedule tasks, handle resource requests from the on-premises virtual machine hypervisor (108), execute or invoke other computer programs, and control peripherals (e.g., any number of input and/or output devices (not shown)). Functionalities of the on-premises OS (106) (if installed) are not limited to the aforementioned examples.

In one embodiment of the invention, the on-premises virtual machine hypervisor (108) may represent a computer program, or a collection of computer programs, configured for managing the on-premises virtual machine instance(s) (110). To that extent, the on-premises virtual machine hypervisor (108) may include functionality to, for example, create or delete the on-premises virtual machine instance(s) (110), allocate or deallocate at least a portion of the on-premises hardware resource(s) (104) (i.e., directly if the on-premises OS (106) is not installed, or indirectly via the on-premises OS (106) if installed) to support the execution of the on-premises virtual machine instance(s) (110) (as well as their respective workloads), and facilitate communications between the on-premises virtual machine instance(s) (110), the on-premises OS (106) (if installed), and/or any subset of the on-premises hardware resource(s) (104). Functionalities of the on-premises virtual machine hypervisor (108) are not limited to the aforementioned examples. Concerning one or more embodiments of the invention, the on-premises virtual machine hypervisor (108) may include further functionality to at least perform the method outlined in FIG. 2, below.

In one embodiment of the invention, the on-premises virtual machine instance(s) (110) may each represent a computer program, or a collection of computer programs, configured for emulating one or many physical computing systems. To that extent, any on-premises virtual machine instance (110) may include functionality to, for example, provide a self-contained execution environment within which one or more applications (not shown) and a guest OS (not shown) may execute. Functionalities of the on-premises virtual machine instance(s) (110) are not limited to the aforementioned examples.

In one embodiment of the invention, the public cloud infrastructure (112) (also referred to as a public cloud) may represent a virtual pool of IT resources and/or computing services, which may be offered by third-party providers over the public Internet to multiple tenants or clients. Any given third-party provider may implement any given portion of the public cloud infrastructure (112) using groups of data centers that may partitioned, through virtualization, and shared amongst the multiple tenants/clients. Furthermore, the public cloud infrastructure (112) may include, but is not limited to, any number of cloud hardware resources (114), (optionally) a cloud OS (116), a cloud virtual machine hypervisor (118), and any number of cloud virtual machine instances (120). Each of these public cloud infrastructure (112) subcomponents is described below.

In one embodiment of the invention, the cloud hardware resource(s) (114) may represent at least a portion of the public cloud infrastructure (112) architecture that includes various physical and/or tangible components. Collectively, these various physical and/or tangible components may enable and provide the framework and resources on which various logical (or software) components (e.g., cloud OS (116) (if installed), cloud virtual machine hypervisor (118), and cloud virtual machine instances (120)) of the public cloud infrastructure (112) may operate. The cloud hardware resource(s) (114) may include, but is/are not limited to, compute resources, storage resources, and network resources (all described above).

In one embodiment of the invention, the cloud OS (116) (if installed) may represent a computer program, or a collection of computer programs, configured for managing the shared utilization of the cloud hardware resource(s) (114) by the various logical (or software) components of the public cloud infrastructure (112). To that extent, the cloud OS (116) (if installed) may include functionality to, for example, support fundamental public cloud infrastructure (112) functions, schedule tasks, handle resource requests from the cloud virtual machine hypervisor (118), execute or invoke other computer programs, and control peripherals (e.g., any number of input and/or output devices (not shown)). Functionalities of the cloud OS (116) (if installed) are not limited to the aforementioned examples In one embodiment of the invention, the cloud virtual machine hypervisor (118) may represent a computer program, or a collection of computer programs, configured for managing the cloud virtual machine instance(s) (120). To that extent, the cloud virtual machine hypervisor (118) may include functionality to, for example, create or delete the cloud virtual machine instance(s) (120), allocate or deallocate at least a portion of the cloud hardware resource(s) (114) (i.e., directly if the cloud OS (116) is not installed, or indirectly via the cloud OS (116) if installed) to support the execution of the cloud virtual machine instance(s) (120) (as well as their respective workloads), and facilitate communications between the cloud virtual machine instance(s) (120), the cloud OS (116) (if installed), and/or any subset of the cloud hardware resource(s) (114). Functionalities of the cloud virtual machine hypervisor (118) are not limited to the aforementioned examples. Concerning one or more embodiments of the invention, the cloud virtual machine hypervisor (118) may include further functionality to at least perform the method outlined in FIGS. 3A and 3B, below.

In one embodiment of the invention, the cloud virtual machine instance(s) (120) may each represent a computer program, or a collection of computer programs, configured for emulating one or many physical computing systems. To that extent, any cloud virtual machine instance (120) may include functionality to, for example, provide a self-contained execution environment within which one or more applications (not shown) and a guest OS (not shown) may execute. Functionalities of the cloud virtual machine instance(s) (120) are not limited to the aforementioned examples.

While FIG. 1 shows a configuration of components, other system (100) configurations may be used without departing from the scope of the invention.

Figure 2:
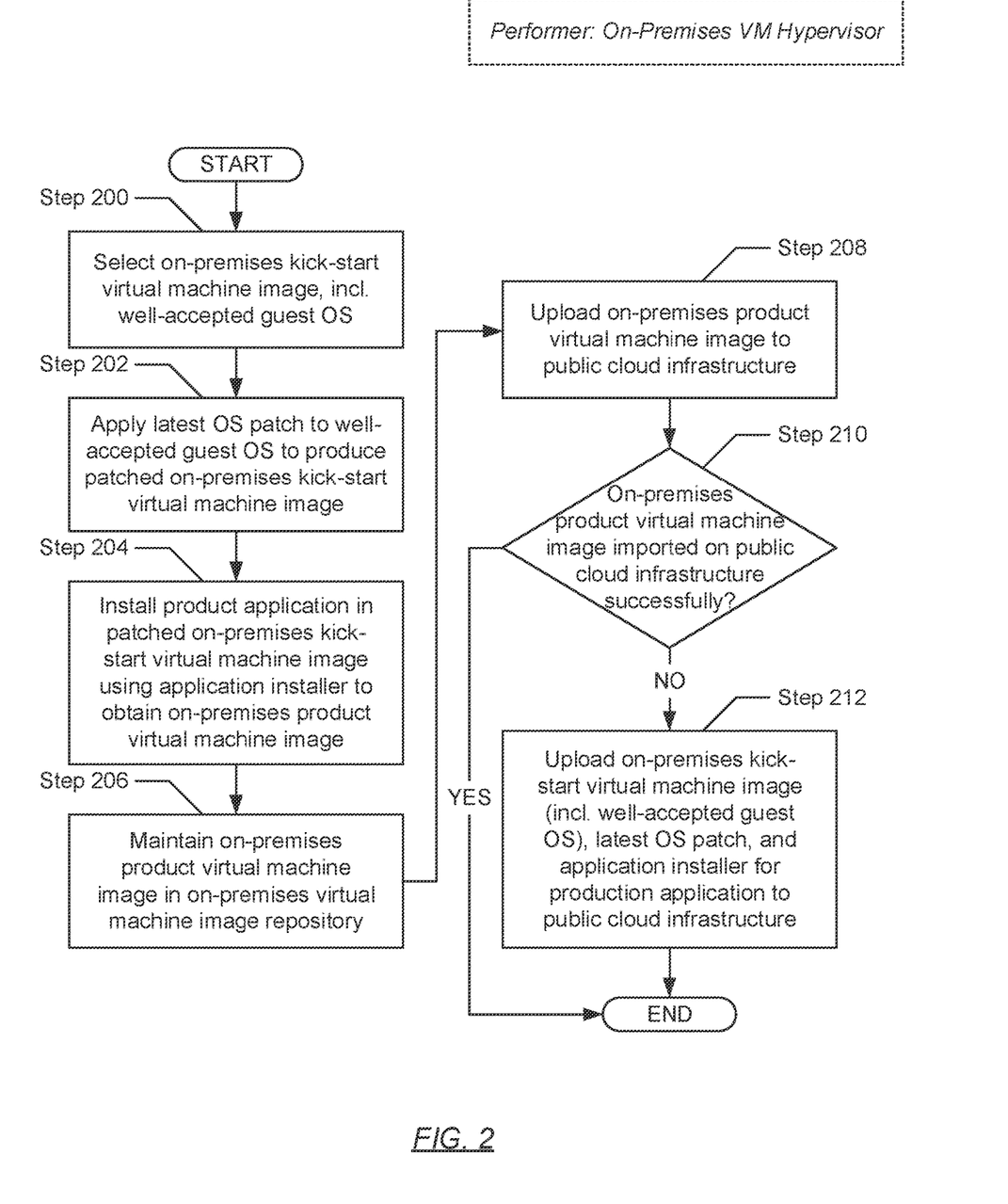
FIG. 2 shows a flowchart describing a method for deploying product applications within virtual machines onto on-premises and public cloud infrastructures in accordance with one or more embodiments of the invention.

FIG. 2 shows a flowchart describing a method for deploying product applications within virtual machines onto on-premises and public cloud infrastructures in accordance with one or more embodiments of the invention. The various steps outlined below may be performed by the on-premises virtual machine hypervisor of the on-premises infrastructure (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 2, in Step 200, an on-premises kick-start virtual machine image is selected. In general, in one embodiment of the invention, a virtual machine image may refer to an electronic document representative of a template or blueprint for creating a given virtual machine instance. Information defining the template or blueprint may include, but is not limited to, a guest OS distribution and configuration information (e.g., an arrangement of allocated resources such as computer processors, memory, storage disks, network adapters, etc.) needed for deployment of the given virtual machine instance. The on-premises kick-start virtual machine image, accordingly, may refer to a template or blueprint for creating an on-premises kick-start virtual machine instance. An on-premises kick-start virtual machine instance, in turn, may refer to a default virtual machine instance at least configured with a well-accepted guest OS distribution. The well-accepted guest OS distribution may encompass any guest OS distribution known to be supported by the public cloud infrastructure.

In Step 202, a latest OS patch is applied to the well-accepted guest OS distribution of the on-premises kick-start virtual machine image (selected in Step 200). In one embodiment of the invention, the latest OS patch may refer to one or many binary or executable electronic file(s) that include a change, or a collection of changes, for the well-accepted guest OS distribution. Specifically, in applying the latest OS patch, a fix or a collection of fixes, correcting security vulnerabilities and/or other faults (e.g., bugs) in the existing version of the well-accepted guest OS distribution, may be addressed, thereby obtaining a most recent, stable version of the well-accepted guest OS distribution. With the latest OS patch applied, the on-premises kick-start virtual machine image becomes a patched on-premises kick-start virtual machine image.

In Step 204, a product application is installed within the patched on-premises kick-start virtual machine image (obtained in Step 202). In one embodiment of the invention, the product application may refer to a computer program, or a collection of computer programs, configured for end-user utilization. Examples of the product application may include, but are not limited to, a word processor, an email client, a database client, a web browser, a media player, a file viewer, an image editor, a simulator, a computer game, a utility, etc. Further, installation of the product application may entail the use of an application installer, or a specialized computer program configured for the installation of software applications (e.g., the product application). Moreover, through installation of the product application, the patched on-premises kick-start virtual machine image becomes an on-premises product virtual machine image.

In Step 206, the on-premises product virtual machine image (obtained in Step 204) is subsequently maintained in an on-premises virtual machine image repository residing on the on-premises infrastructure. In one embodiment of the invention, the on-premises virtual machine image repository may represent a database wherein a collection of virtual machine images, supported by the on-premises infrastructure and awaiting selection and/or use, may be consolidated.

In Step 208, the on-premises product virtual machine image (obtained in Step 204) is also uploaded to the public cloud infrastructure. Thereafter, an attempt may be made, at the public cloud infrastructure, to import the on-premises product virtual machine image into a cloud virtual machine image repository residing on the public cloud infrastructure. The importation may entail the use of a virtual machine image import tool that may be provided by the third-party provider(s) of the public cloud infrastructure. The virtual machine image import tool may refer to a specialized computer program, or a collection of computer programs, configured to facilitate the importation of virtual machine images into the cloud virtual machine image repository.

In one embodiment of the invention, the above-mentioned import attempt may result in success or failure. The former may transpire when the public cloud infrastructure includes up-to-date support for the version or kernel of the patched well-accepted guest OS configured in the uploaded on-premises product virtual machine image. Meanwhile, the latter may alternatively transpire when the public cloud infrastructure excludes up-to-date support for the version or kernel of the patched well-accepted guest OS configured in the uploaded on-premises product virtual machine image.

In Step 210, a determination is made as to whether the import attempt of the on-premises product virtual machine image (uploaded in Step 208) was successful. In one embodiment of the invention, if it is determined that the import attempt resulted in success (e.g., via the receipt of an import success notification from the public cloud infrastructure), then the method ends. On the other hand, in another embodiment of the invention, if it is alternatively determined that the import attempt resulted in failure (e.g., via the receipt of an import failure notification from the public cloud infrastructure), then the method alternatively proceeds to Step 212.

In Step 212, following the determination (in Step 210) that the import attempt of the on-premises product virtual machine image (uploaded in Step 208) had resulted in failure, other items are uploaded to the public cloud infrastructure. In one embodiment of the invention, these other items may include, but are not limited to, the on-premises kick-start virtual machine image (including the well-accepted guest OS) (selected in Step 200), the latest OS patch (mentioned in Step 202), and the application installer (including the product application) (mentioned in Step 204). Utilization of these other items, at the public cloud infrastructure, is described further in detail in FIGS. 3A and 3B, below.

Figure 3A:
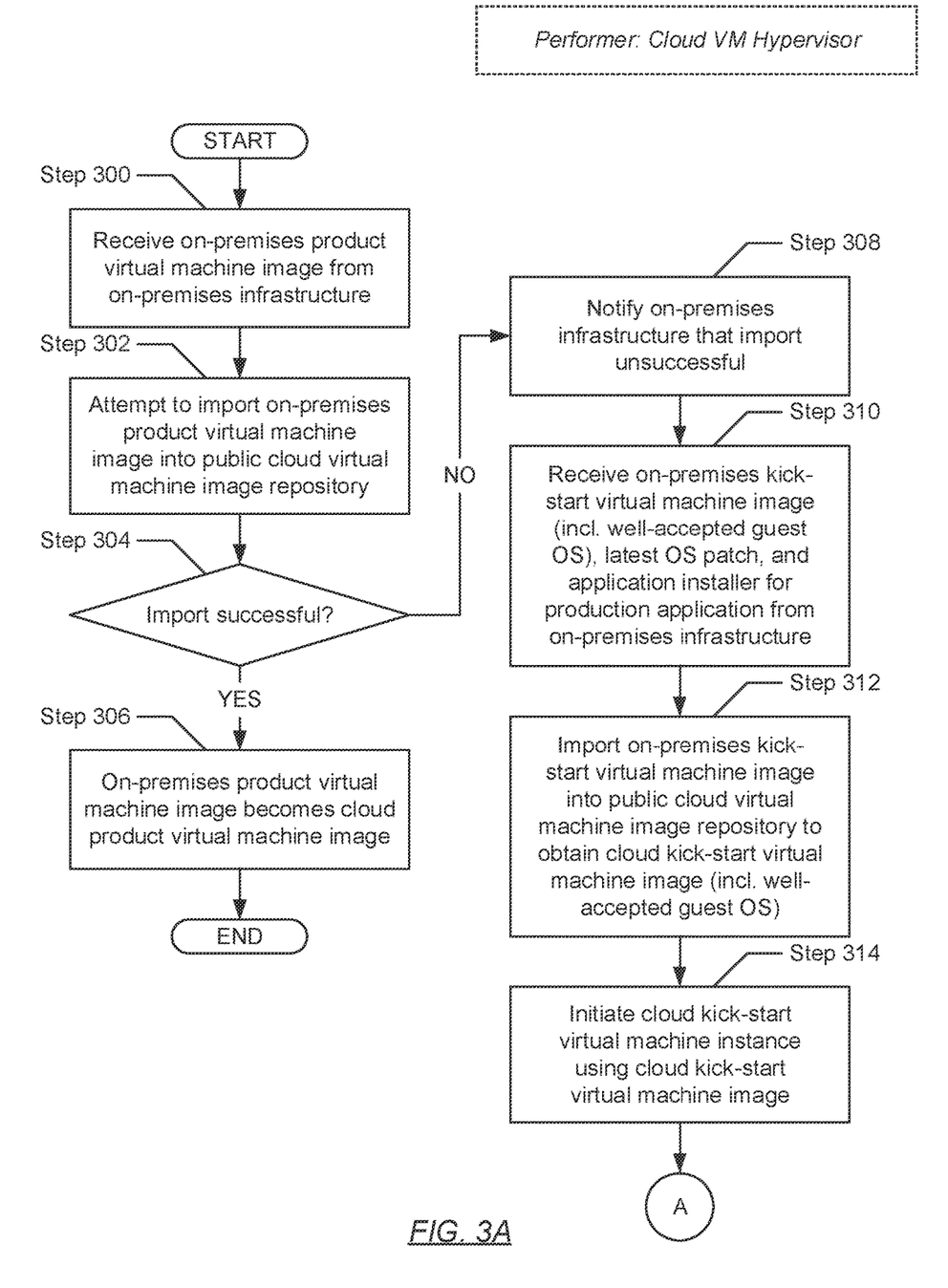
FIGS. 3A and 3B show flowcharts describing a method for deploying product applications within virtual machines onto on-premises and public cloud infrastructures in accordance with one or more embodiments of the invention.
Figure 3B:
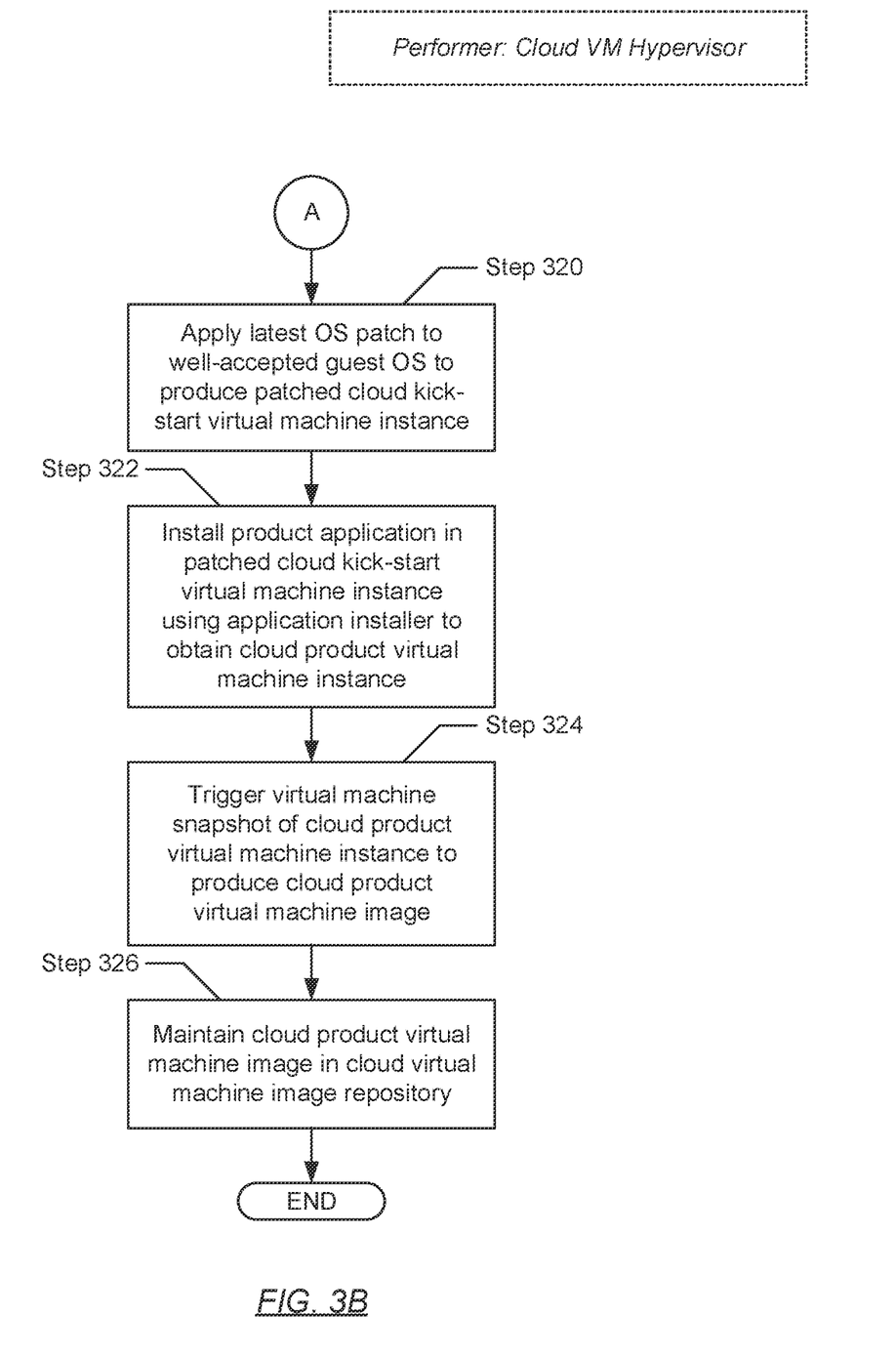

FIGS. 3A and 3B show flowcharts describing a method for deploying product applications within virtual machines onto on-premises and public cloud infrastructures in accordance with one or more embodiments of the invention. The various steps outlined below may be performed by the cloud virtual machine hypervisor of the public cloud infrastructure (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, an on-premises product virtual machine image is received from the on-premises infrastructure. In general, in one embodiment of the invention, a virtual machine image may refer to an electronic document representative of a template or blueprint for creating a given virtual machine instance. Information defining the template or blueprint may include, but is not limited to, a guest OS distribution and configuration information (e.g., an arrangement of allocated resources such as computer processors, memory, storage disks, network adapters, etc.) needed for deployment of the given virtual machine instance. The on-premises product virtual machine image may refer to a kick-start virtual machine image updated with a patched well-accepted guest OS distribution and a product application installed therein (described above) (see e.g., FIG. 2).

In Step 302, an importation of the on-premises product virtual machine image (received in Step 300), into a public cloud virtual machine image repository, is attempted. In one embodiment of the invention, the public cloud virtual machine image repository may represent a database wherein a collection of virtual machine images, supported by the public cloud infrastructure and awaiting selection and/or use, may be consolidated. Further, the importation may entail the use of a virtual machine image import tool that may be provided by the third-party provider(s) of the public cloud infrastructure. The virtual machine image import tool may refer to a specialized computer program, or a collection of computer programs, configured to facilitate the importation of virtual machine images into the cloud virtual machine image repository.

In one embodiment of the invention, the above-mentioned import attempt may result in success or failure. The former may transpire when the public cloud infrastructure includes up-to-date support for the version or kernel of the patched well-accepted guest OS configured in the on-premises product virtual machine image (received in Step 300). Meanwhile, the latter may alternatively transpire when the public cloud infrastructure excludes up-to-date support for the version or kernel of the patched well-accepted guest OS configured in the received on-premises product virtual machine image.

In Step 304, a determination is made as to whether the importation of the on-premises product virtual machine image (attempted in Step 302) was successful. In one embodiment of the invention, if it is determined that the import attempt resulted in success, then the method proceeds to Step 306. On the other hand, in another embodiment of the invention, if it is alternatively determined that the import attempt resulted in failure, then the method alternatively proceeds to Step 308.

In Step 306, following the determination (in Step 304) that the importation of the on-premises product virtual machine image (attempted in Step 302) into the cloud virtual machine image repository succeeded, the on-premises product virtual machine image becomes a cloud product virtual machine image, and the method subsequently ends (e.g., following the submission of an import success notification to the on-premises infrastructure).

In Step 308, following the alternative determination (in Step 304) that the importation of the on-premises product virtual machine image (attempted in Step 302) into the cloud virtual machine image repository failed, an import failure notification is submitted to the on-premises infrastructure.

In Step 310, in response to the import failure notification (submitted in Step 308), various items are received from the on-premises infrastructure. In one embodiment of the invention, these items may include, but are not limited to, an on-premises kick-start virtual machine image (including a well-accepted guest OS distribution), a latest OS patch for the well-accepted guest OS distribution, and an application installer (including and/or for a production application).

In one embodiment of the invention, the well-accepted guest OS distribution may encompass any guest OS distribution known to be supported by the public cloud infrastructure. Meanwhile, the latest OS patch may refer to one or many binary or executable electronic file(s) that include a change, or a collection of changes, for the well-accepted guest OS distribution. Further, the product application may refer to a computer program, or a collection of computer programs, configured for end-user utilization. Examples of the product application may include, but are not limited to, a word processor, an email client, a database client, a web browser, a media player, a file viewer, an image editor, a simulator, a computer game, a utility, etc. The application installer, on the other hand, may refer to a specialized computer program configured for the installation of software applications (e.g., the product application).

In Step 312, the on-premises kick-start virtual machine image (received in Step 310) is imported into the cloud virtual machine image repository. In one embodiment of the invention, the aforementioned importation is successful due to the well-accepted guest OS distribution within the on-premises kick-start virtual machine image, for which the public cloud infrastructure includes up-to-date support. Upon importing into the cloud virtual machine image repository, the on-premises kick-start virtual machine image becomes a cloud kick-start virtual machine image that includes the well-accepted guest OS distribution.

In Step 314, a cloud kick-start virtual machine instance is created using the cloud kick-start virtual machine image (obtained in Step 312), and subsequently initiated. That is, in one embodiment of the invention, the created cloud kick-start virtual machine instance is activated, and is thereby made to run in the virtual environment on the public cloud infrastructure. From here, the method proceeds to Step 320 (see e.g., FIG. 3B).

Turning to FIG. 3B, in Step 320, the latest OS patch (received in Step 310) is then applied to the well-accepted guest OS distribution within the cloud kick-start virtual machine instance (created/initiated in Step 314). In one embodiment of the invention, in applying the latest OS patch, a fix or a collection of fixes, correcting security vulnerabilities and/or other faults (e.g., bugs) in the existing version of the well-accepted guest OS distribution, may be addressed, thereby obtaining a most recent, stable version of the well-accepted guest OS distribution. With the latest OS patch applied, the cloud kick-start virtual machine instance becomes a patched cloud kick-start virtual machine instance that includes a patched well-accepted guest OS distribution.

In Step 322, using the application installer (received in Step 310), the above-mentioned product application is installed within the patched cloud kick-start virtual machine instance (obtained in Step 320). In one embodiment of the invention, through installation of the product application, the patched cloud kick-start virtual machine instance becomes a cloud product virtual machine instance.

In Step 324, a virtual machine snapshot, of the cloud product virtual machine instance (obtained in Step 322), is triggered. In one embodiment of the invention, the virtual machine snapshot may refer to an operation directed to preserving the state and data of a given virtual machine instance at a given point-in-time. Further, in triggering the virtual machine snapshot of the cloud product virtual machine instance, a cloud product virtual machine image may be obtained as a result of the operation.

In Step 326, the cloud product virtual machine image (obtained in Step 326) is subsequently maintained in the cloud virtual machine image repository (described above) residing on the public cloud infrastructure.

Figure 4:
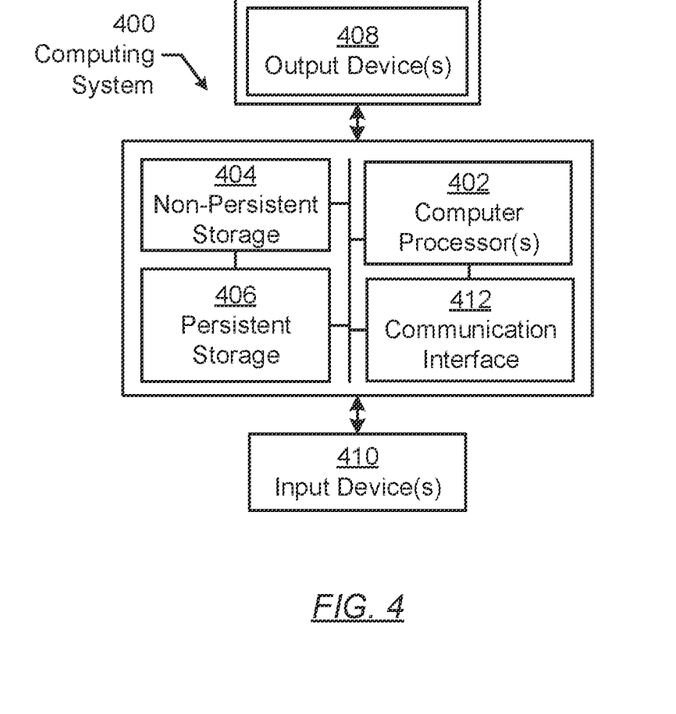
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
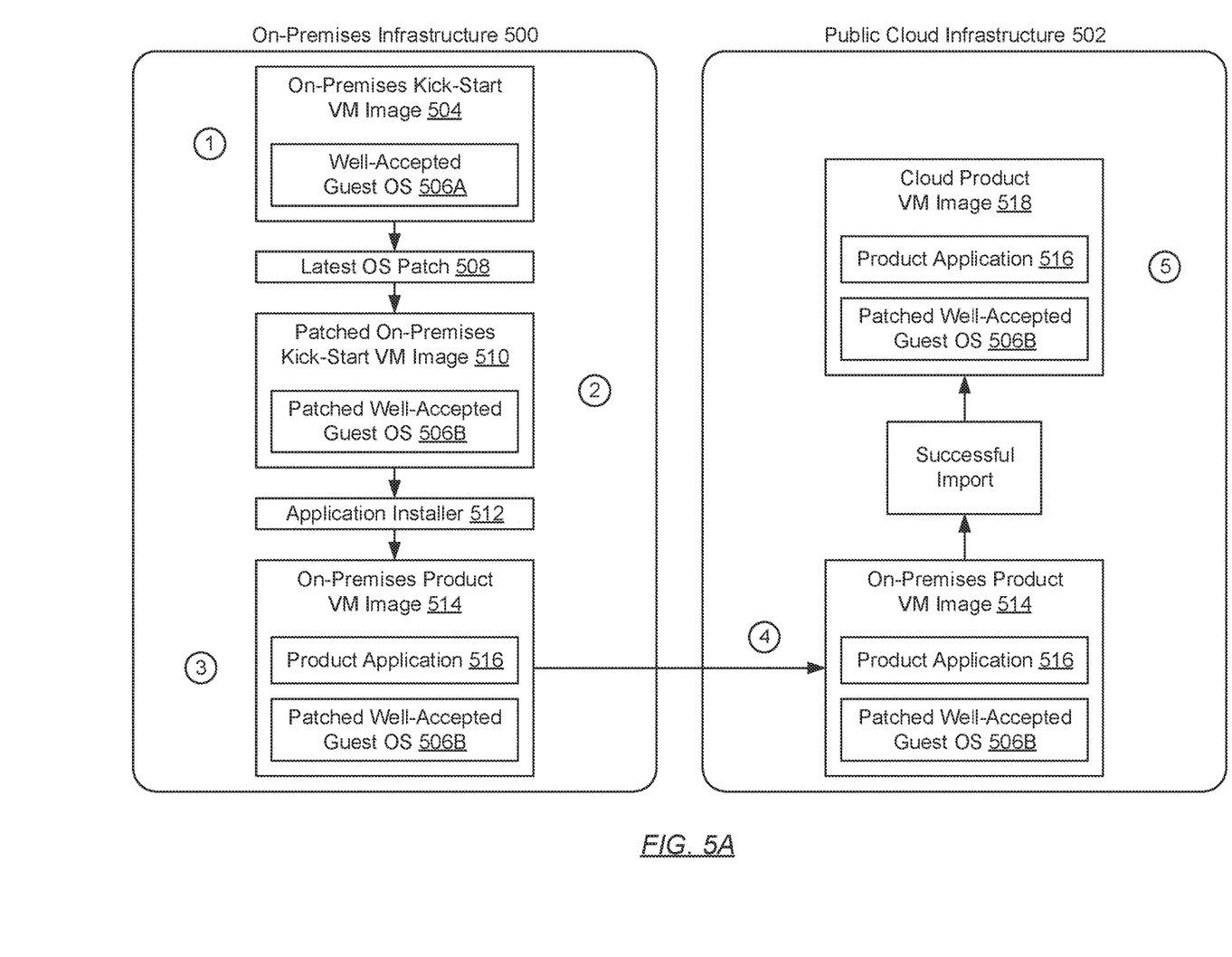
FIGS. 5A and 5B show exemplary scenarios in accordance with one or more embodiments of the invention.
Figure 5B:
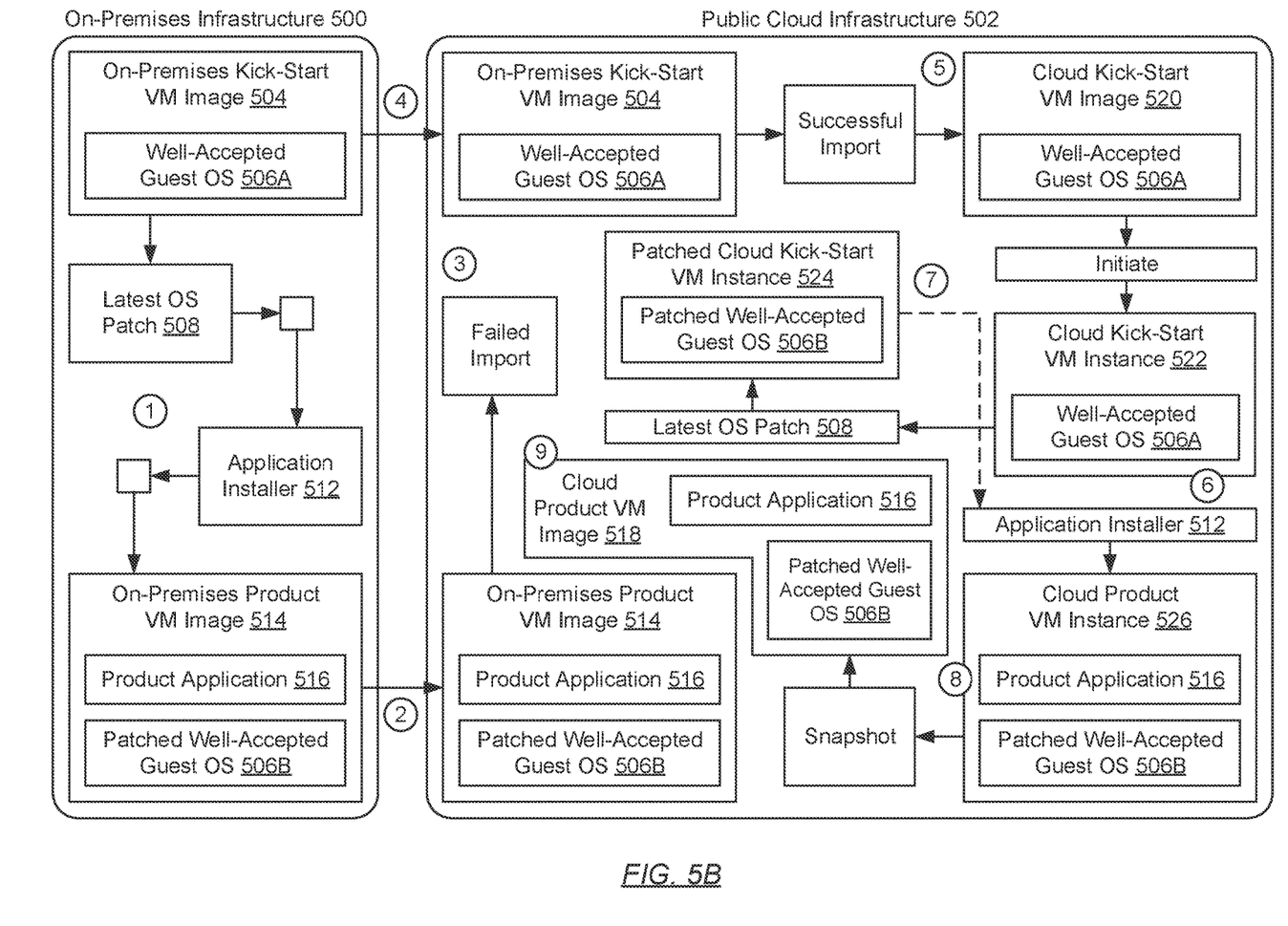

FIGS. 5A and 5B show exemplary scenarios in accordance with one or more embodiments of the invention. The exemplary scenarios, illustrated through FIGS. 5A and 5B and described below, are for explanatory purposes only and not intended to limit the scope of the invention. Further, for context, the first exemplary scenario illustrates and describes a normal workflow (i.e., where an on-premises product virtual machine image succeeds in being imported into a cloud virtual machine image repository) for the deployment of a product application within a virtual machine onto both the on-premises and public cloud infrastructures, whereas the second exemplary scenario illustrates and describes an exception workflow (i.e., where an on-premises product virtual machine image fails in being imported into a cloud virtual machine image repository) of the same.

Exemplary Scenario 1 (FIG. 5A)

1. At the on-premises infrastructure (500), an on-premises kick-start virtual machine (VM) image (504) is selected, which is at least configured with a well-accepted guest operating system (OS) distribution (506A) (e.g., Linux Ubuntu—an open source OS)
2. A latest OS patch (508) for the well-accepted guest OS (506A) is applied to obtain a patched on-premises kick-start VM image (510) that includes a patched well-accepted guest OS distribution (506B)
3. An application installer (512) is subsequently used to install a product application (516) (e.g., Apache OpenOffice—an open source office productivity suite) within the patched on-premises kick-start VM image (510); following the installation of the product application (516), an on-premises product VM image (514) is obtained (and maintained on an on-premises virtual machine image repository)
4. The on-premises product VM image (514) is also uploaded to the public cloud infrastructure (502)
5. At the public cloud infrastructure (502), using a virtual machine image import tool (not shown) provided by the third-party provider(s) of the public cloud infrastructure (502), an attempt to import the uploaded on-premises product VM image (514) into a cloud virtual machine image repository succeeds—i.e., the public cloud infrastructure (502) includes up-to-date support for the patched well-accepted guest OS distribution (506B); further, through the successful importation, the on-premises product VM image (514) becomes a cloud product VM image (518)

Exemplary Scenario 2 (FIG. 5b)

1. At the on-premises infrastructure (500), an on-premises kick-start VM image (504) is selected, which is at least configured with a well-accepted guest OS distribution (506A) (e.g., Linux Ubuntu—an open source OS); subsequently, a latest OS patch (508) for the well-accepted guest OS (506A) is applied to obtain a patched on-premises kick-start VM image (not shown) that includes a patched well-accepted guest OS distribution; thereafter, an application installer (512) is used to install a product application (516) (e.g., Apache OpenOffice—an open source office productivity suite) within the patched on-premises kick-start VM image (not shown), thereby obtaining an on-premises product VM image (514), which is maintained on an on-premises virtual machine image repository
2. The on-premises product VM image (514) is also uploaded to the public cloud infrastructure (502)
3. At the public cloud infrastructure (502), using a virtual machine image import tool (not shown), provided by the third-party provider(s) of the public cloud infrastructure (502), an attempt to import the uploaded on-premises product VM image (514) into a cloud virtual machine image repository fails—i.e., the public cloud infrastructure (502) excludes up-to-date support for the patched well-accepted guest OS distribution (506B)
4. The public cloud infrastructure (502) accordingly submits an import failure notification to the on-premises infrastructure (500); in response, the on-premises infrastructure (500) uploads the on-premises kick-start VM image (504) (including the well-accepted guest OS distribution (506A)), the latest OS patch (508) for the well-accepted guest OS distribution (506A), and the application installer (512) configured to install the product application (516)
5. At the public cloud infrastructure (502) and using the virtual machine image import tool (not shown), an attempt to import the uploaded on-premises kick-start VM image (504) into the cloud virtual machine image repository succeeds—i.e., the public cloud infrastructure (502) includes up-to-date support for the well-accepted guest OS distribution (506A); following the importation, the on-premises kick-start VM image (504) becomes a cloud kick-start VM image (520)
6. The cloud kick-start VM image (520) is subsequently used to create a cloud kick-start VM instance (522), which is then initiated
7. Afterwards, the uploaded latest OS patch (508) is applied to the well-accepted guest OS distribution (506A) within the cloud kick-start VM instance (522) to obtain a patched cloud kick-start VM instance (524) that includes a patched well-accepted guest OS distributed (506B)
8. Using the uploaded application installer (512), the product application (516) is installed within the patched cloud kick-start VM instance (524), thereby resulting in obtaining a cloud product VM instance (526)
9. Thereafter, a virtual machine snapshot, of the cloud product VM instance (526), is triggered; in triggering the virtual machine snapshot, the state and data of the cloud product VM instance (526) is preserved at the given point-in-time to obtain a cloud product VM image (518), which is subsequently maintained on the cloud virtual machine image repository While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deploying product applications within virtual machines from an on-premises infrastructure onto a public cloud infrastructure, the method comprising:
receiving, by the public cloud infrastructure and from the on-premises infrastructure, an on-premises product virtual machine image comprising a product application;
performing, by the public cloud infrastructure and using a virtual machine image import tool configured to facilitate virtual machine image importation, a first import attempt of the on-premises product virtual machine image into a cloud virtual machine image repository of the public cloud infrastructure;
obtaining, by the public cloud infrastructure and based on a failure result of the first import attempt provided by the virtual machine import tool, a cloud product virtual machine instance; and
triggering, by the public cloud infrastructure, a virtual machine snapshot of the cloud product virtual machine instance to produce a cloud product virtual machine image comprising the product application.

2. The method of claim 1, wherein the on-premises product virtual machine image further comprises a patched guest operating system (OS) distribution.

3. The method of claim 2, wherein the first import attempt fails based on the public cloud infrastructure lacking up-to-date support for the patched guest OS distribution.

4. The method of claim 1, wherein to obtain the cloud product virtual machine instance, the method further comprises:
initiating, by the public cloud infrastructure, a cloud kick-start virtual machine instance comprising a guest operating system (OS) distribution;
applying, by the public cloud infrastructure and to the guest OS distribution, a latest OS patch to obtain a patched cloud kick-start virtual machine instance; and
installing, by the public cloud infrastructure and using an application installer configured for software application installation, the product application within the patched cloud kick-start virtual machine instance to obtain the cloud product virtual machine instance.

5. The method of claim 4, wherein the cloud kick-start virtual machine instance is created from a cloud kick-start virtual machine image that comprises the guest OS distribution.

6. The method of claim 5, the method further comprising:
prior to initiating the cloud kick-start virtual machine instance:
performing, by the public cloud infrastructure and using the virtual machine image import tool, a second import attempt of an on-premises kick-start virtual machine image into the cloud virtual machine image repository; and
obtaining, by the public cloud infrastructure and based the second import attempt succeeding, the cloud kick-start virtual machine image from the on-premises kick-start virtual machine image.

7. The method of claim 6, wherein the on-premises kick-start virtual machine image comprises the guest OS distribution, wherein the second import attempt succeeds based on the public cloud infrastructure having up-to-date support for the guest OS distribution.

8. The method of claim 6, the method further comprising:
prior to performing the second import attempt:
submitting, by the public cloud infrastructure and based on the first import attempt failing, an import failure notification to the on-premises infrastructure; and
receiving, by the public cloud infrastructure and from the on-premises infrastructure and in response to submitting the import failure notification, the on-premises kick-start virtual machine image, the latest OS patch, and the application installer.

9. The method of claim 1, the method further comprising:
receiving, by the public cloud infrastructure and from the on-premises infrastructure, a second on-premises product virtual machine image comprising a second product application;
performing, by the public cloud infrastructure and using the virtual machine image import tool a second import attempt of the second on-premises product virtual machine image into the cloud virtual machine image repository; and
obtaining, by the public cloud infrastructure and based on the second import attempt succeeding and from the second on-premises product virtual machine image, a second cloud product virtual machine image comprising the second product application.

10. The method of claim 9, wherein the second on-premises product virtual machine image further comprises a guest operating system (OS) distribution, wherein the second import attempt succeeds based on the public cloud infrastructure having up-to-date support for the guest OS distribution.

11. A non-transitory computer readable medium (CRM) comprising computer readable program code, which when executed by a computer processor, enables the computer processor to perform a method for deploying product applications within virtual machines from an on-premises infrastructure onto a public cloud infrastructure, the method comprising:
receiving, by the public cloud infrastructure and from the on-premises infrastructure, an on-premises product virtual machine image comprising a product application;
performing, by the public cloud infrastructure and using a virtual machine image import tool configured to facilitate virtual machine image importation, a first import attempt of the on-premises product virtual machine image into a cloud virtual machine image repository of the public cloud infrastructure;
obtaining, by the public cloud infrastructure and based on a failure result of the first import attempt provided by the virtual machine import tool, a cloud product virtual machine instance; and
triggering, by the public cloud infrastructure, a virtual machine snapshot of the cloud product virtual machine instance to produce a cloud product virtual machine image comprising the product application.

12. The non-transitory CRM of claim 11, wherein the on-premises product virtual machine image further comprises a patched guest operating system (OS) distribution.

13. The non-transitory CRM of claim 12, wherein the first import attempt fails based on the public cloud infrastructure lacking up-to-date support for the patched guest OS distribution.

14. The non-transitory CRM of claim 11, wherein to obtain the cloud product virtual machine instance, the method further comprises:
initiating, by the public cloud infrastructure, a cloud kick-start virtual machine instance comprising a guest operating system (OS) distribution;
applying, by the public cloud infrastructure and to the guest OS distribution, a latest OS patch to obtain a patched cloud kick-start virtual machine instance; and
installing, by the public cloud infrastructure and using an application installer configured for software application installation, the product application within the patched cloud kick-start virtual machine instance to obtain the cloud product virtual machine instance.

15. The non-transitory CRM of claim 14, wherein the cloud kick-start virtual machine instance is created from a cloud kick-start virtual machine image that comprises the guest OS distribution.

16. The non-transitory CRM of claim 15, the method further comprising:
prior to initiating the cloud kick-start virtual machine instance:
performing, by the public cloud infrastructure and using the virtual machine image import tool, a second import attempt of an on-premises kick-start virtual machine image into the cloud virtual machine image repository; and
obtaining, by the public cloud infrastructure and based the second import attempt succeeding, the cloud kick-start virtual machine image from the on-premises kick-start virtual machine image.

17. The non-transitory CRM of claim 16, wherein the on-premises kick-start virtual machine image comprises the guest OS distribution, wherein the second import attempt succeeds based on the public cloud infrastructure having up-to-date support for the guest OS distribution.

18. The non-transitory CRM of claim 16, the method further comprising:
prior to performing the second import attempt:
submitting, by the public cloud infrastructure and based on the first import attempt failing, an import failure notification to the on-premises infrastructure; and
receiving, by the public cloud infrastructure and from the on-premises infrastructure and in response to submitting the import failure notification, the on-premises kick-start virtual machine image, the latest OS patch, and the application installer.

19. The non-transitory CRM of claim 11, the method further comprising:

receiving, by the public cloud infrastructure and from the on-premises infrastructure, a second on-premises product virtual machine image comprising a second product application;

performing, by the public cloud infrastructure and using the virtual machine image import tool a second import attempt of the second on-premises product virtual machine image into the cloud virtual machine image repository; and obtaining, by the public cloud infrastructure and based on the second import attempt succeeding and from the second on-premises product virtual machine image, a second cloud product virtual machine image comprising the second product application.

20. The non-transitory CRM of claim 19, wherein the second on-premises product virtual machine image further comprises a guest operating system (OS) distribution, wherein the second import attempt succeeds based on the public cloud infrastructure having up-to-date support for the guest OS distribution.

\* \* \* \* \*